(12) United States Patent
Nagasaka et al.

(10) Patent No.: US 8,640,130 B2
(45) Date of Patent: Jan. 28, 2014

(54) INFORMATION PROCESSING APPARATUS, APPLICATION CONTROL METHOD, AND PROGRAM

(75) Inventors: Hideo Nagasaka, Kanagawa (JP); Tadaaki Kimijima, Tokyo (JP)

(73) Assignee: Sony Corporation (JP)

( * ) Notice: Subject to any disclaimer, the term of this patent is extended or adjusted under 35 U.S.C. 154(b) by 192 days.

(21) Appl. No.: 13/210,546

(22) Filed: Aug. 16, 2011

(65) Prior Publication Data

US 2012/0054753 A1 Mar. 1, 2012

(30) Foreign Application Priority Data

Aug. 24, 2010 (JP) ................. P2010-187610

(51) Int. Cl.
*G06F 9/46* (2006.01)
(52) U.S. Cl.
USPC .......................................... 718/100; 719/319
(58) Field of Classification Search
USPC ................. 718/1, 100; 719/319, 320
See application file for complete search history.

(56) References Cited

U.S. PATENT DOCUMENTS

| 6,144,663 A * | 11/2000 | Hallenstal .................... 370/392 |
| 6,710,771 B1 | 3/2004 | Yamaguchi et al. |
| 6,934,834 B2 * | 8/2005 | Melin et al. ....................... 713/2 |
| 7,614,010 B2 * | 11/2009 | Hosoki et al. ................. 715/783 |

FOREIGN PATENT DOCUMENTS

JP 2000-322185 A 11/2000

* cited by examiner

*Primary Examiner* — Diem Cao
(74) *Attorney, Agent, or Firm* — Lerner, David, Littenberg, Krumholz & Mentlik, LLP

(57) ABSTRACT

An information processing apparatus including: an output unit configured to output an image; an operation input unit configured to receive an operation of a user; a storage configured to store a group information item that indicates, as one group, a plurality of applications having time slots during which the applications have been activated at the same time out of a plurality of applications that have been activated and ended; and a controller configured to control the output unit to output, when an operation for activating a first application out of the plurality of applications is input by the operation input unit, an operation image for activating all the applications within the group including the first application at the same time based on the group information item.

8 Claims, 10 Drawing Sheets

| Simultaneous activation group | Activation count |
|---|---|
| Application A, Application C | 2 |
| Application A, Application B, Application D | 1 |
| Application B, Application D, Application E | 3 |
| Application B, Application C, Application F | 1 |
| Application A, Application B | 4 |
| ⋮ | ⋮ |

INFORMATION PROCESSING APPARATUS, APPLICATION CONTROL METHOD, AND PROGRAM

BACKGROUND

The present disclosure relates to an information processing apparatus capable of controlling activation processing of a plurality of application software (hereinafter, referred to as application), and an application control method and program in the information processing apparatus.

Many OS's (Operating Systems) mounted to information processing apparatuses such as a PC (Personal Computer) and a portable terminal are capable of performing multitask processing in which a plurality of applications are activated at the same time and a plurality of processing are executed in parallel. In such a multitask environment, a user is capable of, for example, editing an image using an image edit application and taking in the edited photograph in a document creation application.

Incidentally, when executing the plurality of applications, the user needs to perform complicated operations for activating the applications. As a technique for alleviating the complications as described above, there is known, from the past, a so-called launcher function. For example, Japanese Patent Application Laid-open No. 2000-322185 (hereinafter, referred to as Patent Document 1) discloses an information processing apparatus that is capable of displaying a list of pre-registered applications that are used frequently and activating, when a user selects a desired application from the list using a jog dial, that application.

SUMMARY

However, the plurality of applications displayed on the list by the launcher function disclosed in Patent Document 1 and the like are not always used at the same time though they may be used frequently as a single application. Therefore, for activating the plurality of applications that are used at the same time, the user may need to repeat, the number of times corresponding to the number of applications to be activated, processing of selecting the applications that the user wishes to use at the same time after judging relevancies of the applications on the list.

In view of the circumstances as described above, there is a need for an information processing apparatus, an application control method, and a program that are capable of simultaneously activating a plurality of applications that are highly likely to be used at the same time.

According to an embodiment of the present disclosure, there is provided an information processing apparatus including an output unit, an operation input unit, a storage, and a controller. The output unit is configured to output an image. The output unit may be a display incorporated into the information processing apparatus or an output terminal that outputs an image to an external display apparatus. The operation input unit is configured to receive an operation of a user. The storage is configured to store a group information item that indicates, as one group, a plurality of applications having time slots during which the applications have been activated at the same time out of a plurality of applications that have been activated and ended. The controller is configured to control the output unit to output, when an operation for activating a first application out of the plurality of applications is input by the operation input unit, an operation image for activating all the applications within the group including the first application at the same time based on the group information item.

With this structure, by storing the plurality of applications that have been activated at the same time in the past as the group information, the information processing apparatus can simultaneously activate the plurality of applications that are highly likely to be used at the same time based on the group information.

Here, the plurality of applications may be stored (installed) in the storage and executed by the controller, or executed by a server (ASP (Application Server Provider)) connected via a network or the like and used by the information processing apparatus.

The storage may store, for a plurality of applications that have been activated at the same time at different time slots, a plurality of group information items and an activation count information item that indicates, within a predetermined period, an activation count of each group indicated by each of the plurality of group information items. In this case, the controller may control the output unit to output, when an operation for activating the first application is input, the operation image at least for a group having a highest activation count out of a plurality of groups including the first application, based on the plurality of group information items and the activation count information item.

Accordingly, the information processing apparatus can present a group that is mostly likely to be used at the same time to the user even when there are a plurality of groups that include the first application.

The controller may end, when an operation for ending any of the applications included in the group that has been activated at the same time is input, all the applications included in the group at the same time.

Accordingly, by merely performing an end operation for any of the applications within the group activated at the same time, all the applications within the group can be ended, with the result that complications of performing an end operation for each application can be eliminated.

The information processing apparatus may further include a communication unit configured to receive the group information item and the activation count information item from a server storing the group information item and the activation count information item related to applications activated in a plurality of other information processing apparatuses. In this case, the controller may control the output unit to output the operation image based on the stored group information item and activation count information item and the group information item and the activation count information item received from the server.

Accordingly, even when not much group information or activation count information is stored in the information processing apparatus, for example, the information processing apparatus can simultaneously activate the applications that are likely to be activated at the same time by many users based on a state of simultaneous activations of the applications by users of a plurality of other information processing apparatuses.

The controller may control the output unit to output a first operation image corresponding to a first group information item out of the plurality of group information items and a second operation image corresponding to a second group information item different from the first group information item. Further, the controller may compare the first group information item and the second group information item when the user operation with respect to the second operation image is received while a plurality of applications indicated by the first group information item are being executed based on the user operation with respect to the first operation image, and end all the applications included in a group indicated by the first group information item at the same time when it is judged that any of the applications included in the group indicated by the first group information item is not included in a group indicated by the second group information item.

Accordingly, the information processing apparatus can prevent, when an activation request for applications of a certain group is received while applications of a different group are being executed, the applications from being ended despite the intention of the user by simultaneously ending the applications of the group that is being activated for the first time when the groups are not related (i.e., no common application in both groups).

The controller may control the output unit to output, while a plurality of applications indicated by first group information item are being executed based on the user operation with respect to a first operation image corresponding to the first group information item out of the plurality of group information items, a second operation image for activating a plurality of applications indicated by a second group information item different from the first group information item in place of a plurality of applications indicated by the first group information item and a third operation image for activating in addition to the plurality of applications indicated by the first group information item.

Accordingly, the information processing apparatus can selectively execute, while applications of a certain group are being executed, group switch processing and group additional activation processing depending on a purpose of the user.

According to another embodiment of the present disclosure, there is provided an application control method including storing group information that indicates, as one group, a plurality of applications having time slots during which the applications have been activated at the same time out of a plurality of applications that have been activated and ended. When an operation for activating a first application out of the plurality of applications is input, an operation image for activating all the applications within the group including the first application at the same time is output based on the group information.

According to another embodiment of the present disclosure, there is provided a program causing an information processing apparatus to execute the steps of: storing group information that indicates, as one group, a plurality of applications having time slots during which the applications have been activated at the same time out of a plurality of applications that have been activated and ended; and outputting, when an operation for activating a first application out of the plurality of applications is input, an operation image for activating all the applications within the group including the first application at the same time based on the group information.

As described above, according to the embodiments of the present disclosure, a plurality of applications that are highly likely to be used at the same time can be activated at the same time.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a diagram showing an example of a simultaneous activation group database of the PC according to the embodiment of the present disclosure;

DETAILED DESCRIPTION OF EMBODIMENTS

Hereinafter, an embodiment of the present disclosure will be described with reference to the drawings.

(Hardware Structure of PC)

Figure 1:
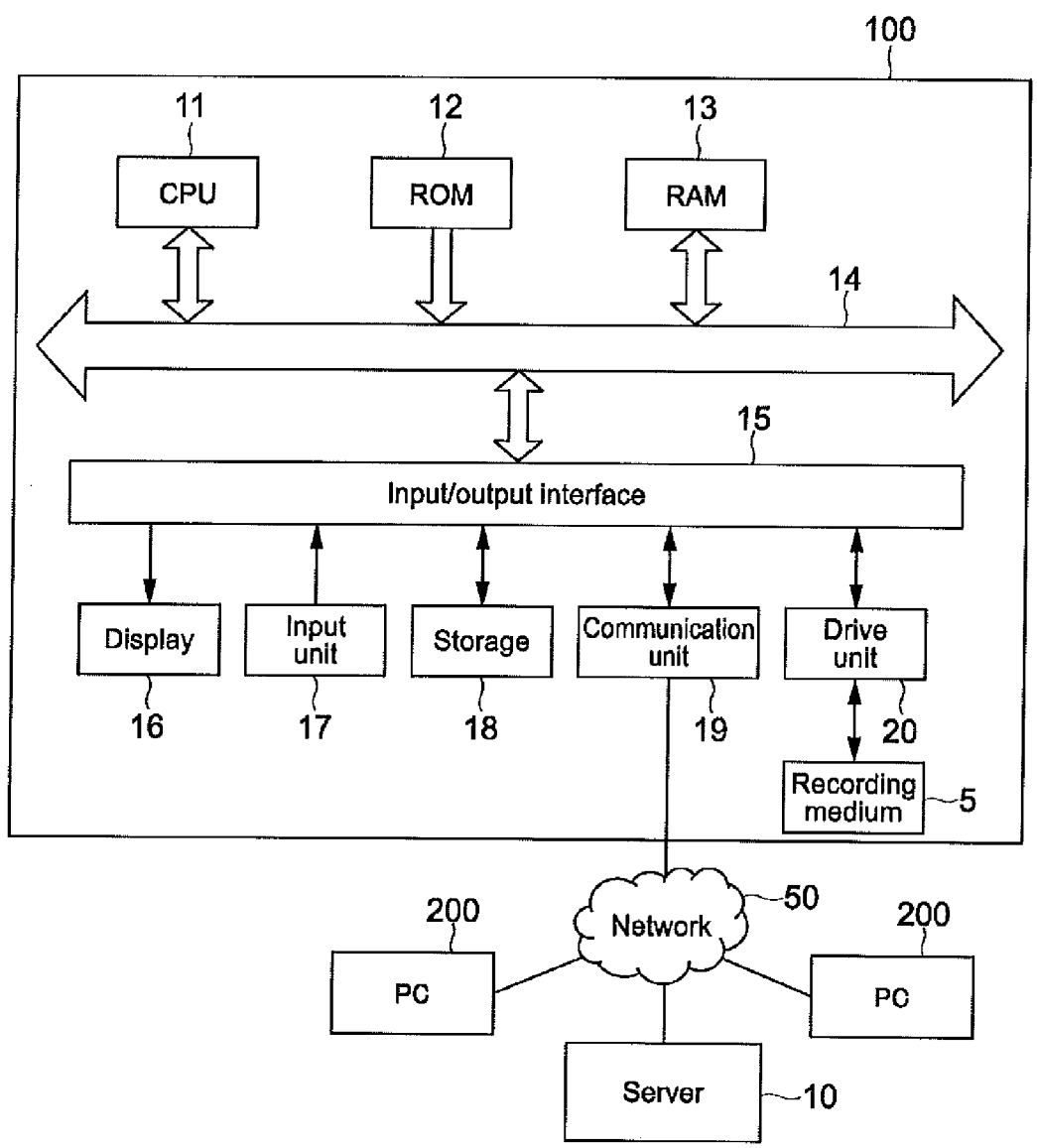
FIG. 1 is a diagram showing a hardware structure of a PC according to an embodiment of the present disclosure.

FIG. 1 is a diagram showing a hardware structure of a PC according to an embodiment of the present disclosure. As shown in the figure, a PC 100 includes a CPU (Central Processing Unit) 11, a ROM (Read Only Memory) 12, a RAM (Random Access Memory) 13, an input/output interface 15, and a bus 14 for mutually connecting them.

The CPU 11 accesses the RAM 13 and the like as appropriate and collectively controls the overall blocks of the PC 100 while carrying out various types of operational processing. The ROM 12 is a nonvolatile memory that fixedly stores firmware such as an OS executed by the CPU 11, programs, and various parameters. The RAM 13 is used as a working area of the CPU 11 and temporarily stores an OS, various applications that are being executed, and various types of data that are being processed.

Connected to the input/output interface 15 are a display 16, an input unit 17, a storage 18, a communication unit 19, a drive unit 20, and the like.

The display 16 is a display device that uses, for example, liquid crystal, EL (Electro-Luminescence), and CRT (Cathode Ray Tube). The display 16 may either be incorporated into the PC 100 or externally connected to the PC 100.

The input unit 17 is, for example, a pointing device such as a mouse, a keyboard, a touch panel, or other operation apparatuses. When the input unit 17 includes a touch panel, the touch panel may be integrated with the display 16.

The storage 18 is a nonvolatile memory such as an HDD (Hard Disk Drive), a flash memory, and other solid-state memories. The storage 18 stores an OS, various applications, and various types of data described above. Especially in this embodiment, the storage 18 stores data of a plurality of application programs (hereinafter, referred to as applications) that have been installed via a recording medium or installed after being downloaded from a network 50 via the communication unit 19, and a program for recommending an application to a user (hereinafter, referred to as application launcher).

The drive unit 20 drives the removable recording medium 5 such as a memory card, an optical recording medium, a floppy (registered trademark) disk, and a magnetic recording tape, and reads/writes data onto/from the recording medium 5.

The communication unit 19 is, for example, an NIC (Network Interface Card) that can be connected to the network such as a LAN (Local Area Network) and a WAN (Wide Area Network). The PC 100 is capable of communication with a server 10 on the network 50 using the communication unit 19. The communication unit 19 may establish communication using wires or wirelessly.

The server 10 collects, as well as store and manage various applications that can be downloaded by the PC 100 and a plurality of other PCs 200 of different users, activation history information of the applications from the PC 100 and the PCs 200 and manages them.

(Software Structure of PC)

Figure 2:
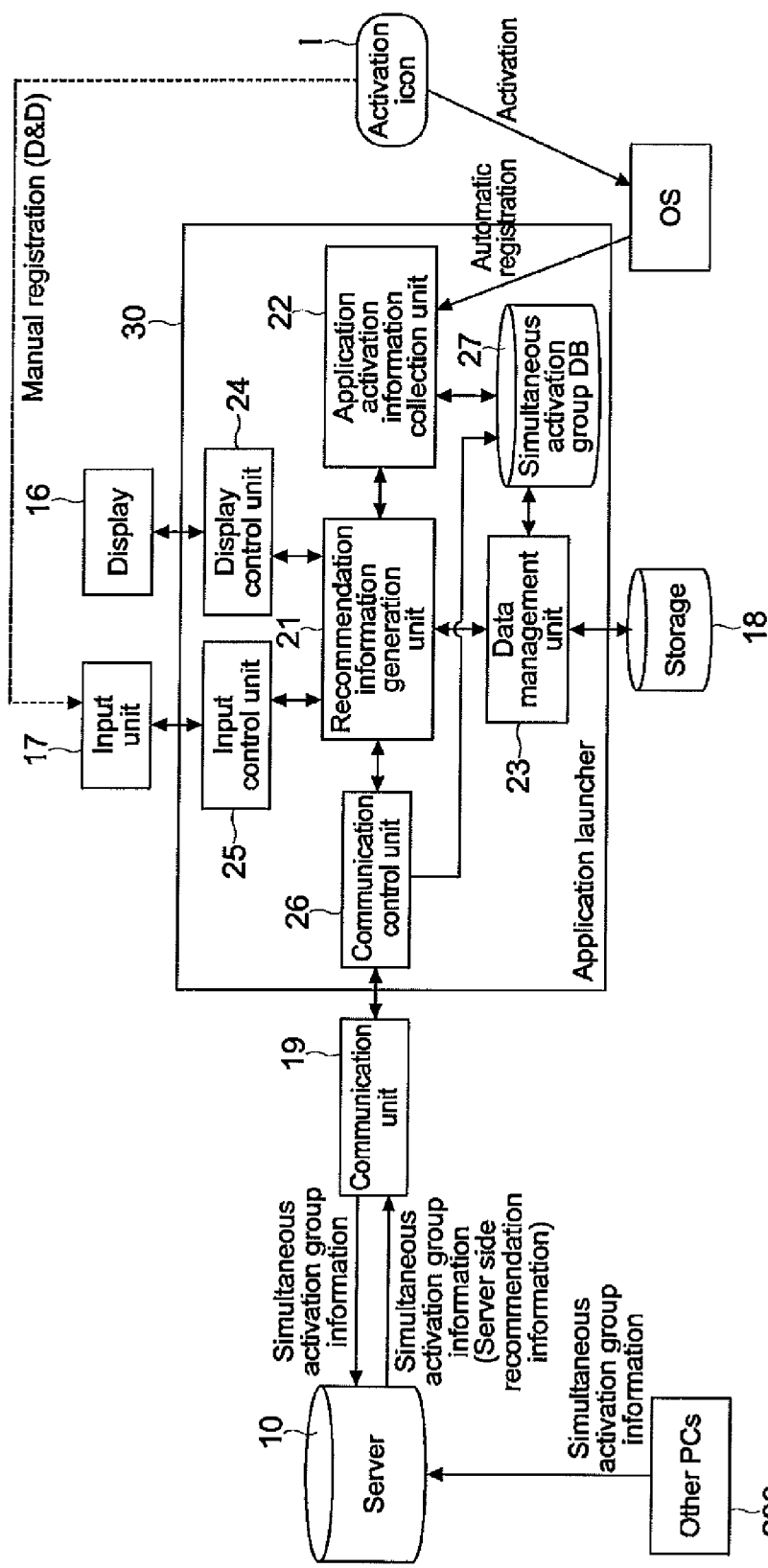
FIG. 2 is a diagram showing functional blocks of an application launcher of the PC according to the embodiment of the present disclosure.

FIG. 2 is a diagram showing functional blocks (module structures) of the application launcher that the PC 100 includes.

As shown in the figure, the application launcher of the PC 100 includes a recommendation information generation unit 21, an application activation information collection unit 22, a data management unit 23, a display control unit 24, an input control unit 25, a communication control unit 26, and a simultaneous activation group database (DB) 27.

Every time a user activates an application by an operation to an activation icon I on the PC 100, the application activation information collection unit 22 collects activation/end history information of that application. Specifically, the application activation information collection unit 22 inquires an OS on whether there is an application that has been activated or ended and stores, as the activation/end history information, a name and activation/end time information of the activated/ended application. When the OS is Windows (registered trademark), for example, information on an activated or ended application is managed by a task manager, and the information is collected from the task manager.

In addition, the application activation information collection unit 22 generates, based on the activation/end history information, simultaneous activation group information that indicates as one group a plurality of applications that have been activated at the same time in a certain time slot, and stores the simultaneous activation group information and activation count information of each group in the simultaneous activation group DB 27.

Not only the simultaneous activation group information and activation count information generated from the activation/end history information of the PC 100, but also simultaneous activation group information of other PCs 200 that has been received from the server 10 is also stored in the simultaneous activation group DB 27.

The data management unit 23 manages information on applications installed in the PC 100 (e.g., information on name, manufacturer, icon for activating application). The data management unit 23 periodically checks the applications installed in the PC 100 and updates the information as appropriate, for example.

The communication control unit 26 controls communication processing with the server 10. Specifically, the communication control unit 26 transmits the simultaneous activation group information and activation count information stored in the simultaneous activation group DB 27 to the server 10.

Further, the server 10 couples (counts), as a collective intelligence, a plurality of pieces of simultaneous activation group information and activation count information collected from the other PCs 200 that include an application launcher similar to the PC 100, and transmits those information to the PC 100 as application recommendation information. The communication control unit 26 stores the simultaneous activation group information and activation count information transmitted from the server 10 and received by the communication unit 19 in the simultaneous activation group DB 27.

The recommendation information generation unit 21 displays, when a certain application is activated based on the simultaneous activation group information and activation count information that have been generated by the application activation information collection unit 22 and stored in the simultaneous activation group DB 27 and the simultaneous activation group information and activation count information as the collective intelligence that have been received from the server 10, a group activation button for activating all the applications within a group including the application at the same time. In other words, from a user, groups are generated automatically based on his/her own application activation/end operation (automatic registration).

Further, when the user drag-and-drops an activation icon I of an application in a GUI (Graphical User Interface) of the application launcher, the recommendation information generation unit 21 can additionally register the application corresponding to the operated activation icon I to the group and reflect it on the group activation button (manual registration).

The input control unit 25 monitors an operation state of, for example, the drag-and-drop operation made by the input unit 17 and transfers the operation information to the recommendation information generation unit 21 for the manual registration. The input control unit 25 also monitors a press operation of the user on the group activation button and transfers the operation information to the recommendation information generation unit 21 for activating a plurality of applications at the same time.

The display control unit 24 controls display processing of GUIs of the application launcher by the display 16, such as the group activation button.

(Operation of PC)

Next, an operation of the PC 100 structured as described above will be described. Although the CPU 11 of the PC 100 is mainly an operation subject in descriptions below, the operation is performed in cooperation with other hardware described above and the application launcher that is executed under control of the CPU 11.

(Generation Processing for Simultaneous Activation Group Information)

Figure 3:
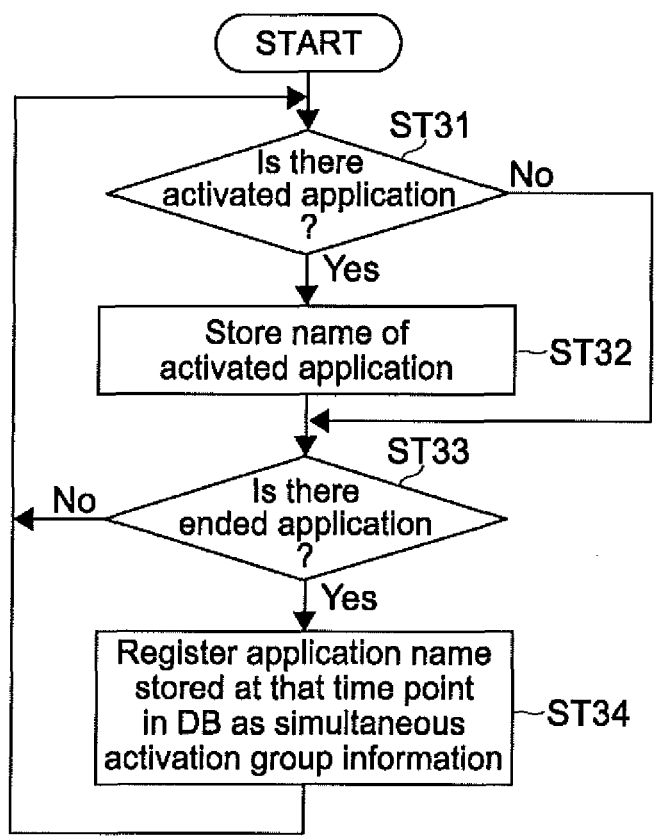
FIG. 3 is a flowchart showing a flow of generation processing for simultaneous activation group information that is carried out by the PC according to the embodiment of the present disclosure.
Figure 4:
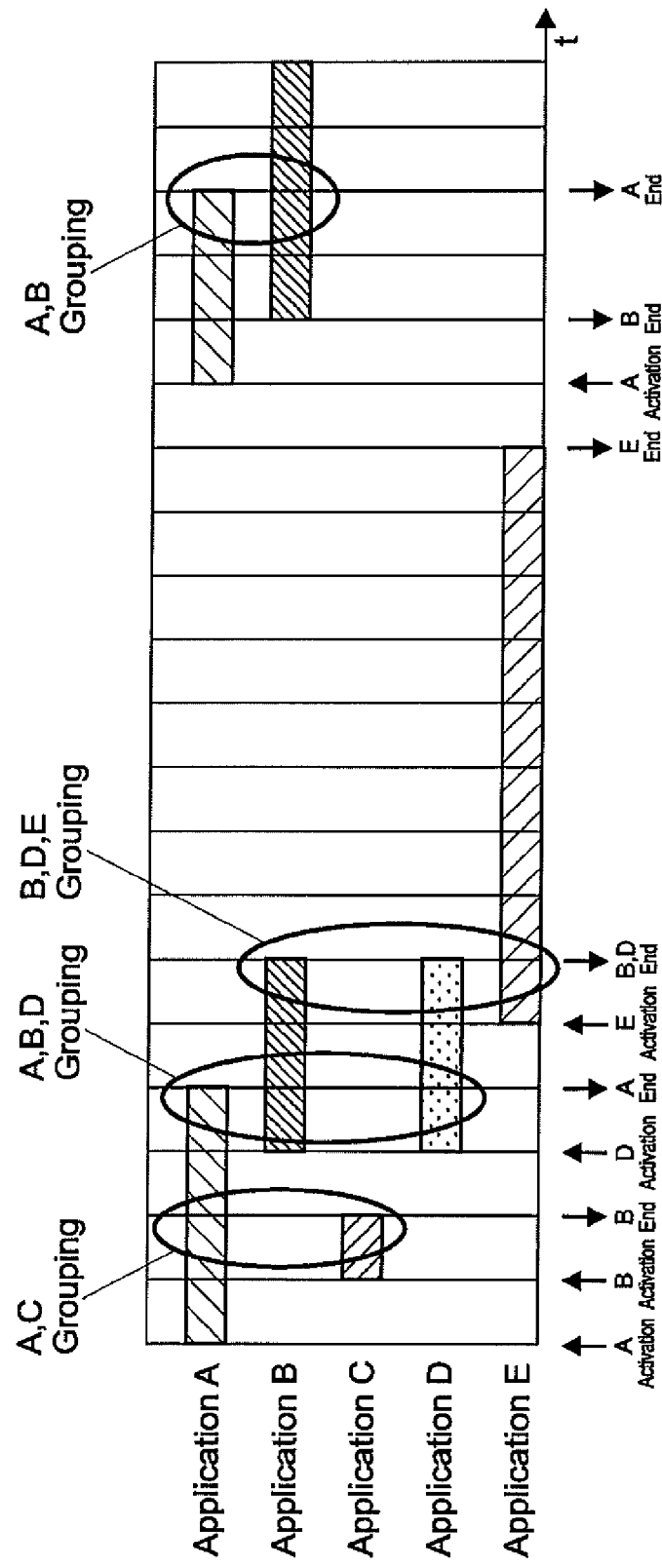
FIG. 4 is a diagram schematically showing the generation processing for simultaneous activation group information that is carried out by the PC according to the embodiment of the present disclosure.

First, generation processing for the simultaneous activation group information will be described. FIG. 3 is a flowchart showing a flow of the generation processing for the simultaneous activation group information. Further, FIG. 4 is a diagram schematically showing the generation processing for the simultaneous activation group information. The following operation is executed by the CPU 11 in cooperation with the application activation information collection unit 22.

As shown in the figure, the CPU 11 first makes an inquiry to the OS to judge whether there is an activated application (Step 31). When judged that there is an activated application (Yes), the CPU 11 stores a name of the activated application in the RAM 13 or the like (Step 32).

Subsequently, the CPU 11 similarly makes an inquiry to the OS as in Step 31 above to judge whether there is an application that has been activated and ended (Step 33). When judged that there is an ended application (Yes), the CPU 11 registers, as simultaneous activation group information, all the application names stored at that ended time point in the simultaneous activation group DB 27 (Step 34). At this time, the CPU 11 also records the activation count information as the simultaneous activation group.

For example, since an application A is activated at a time point an application C is activated and ended as shown in FIG. 4, the CPU 11 registers the applications A and C as one simultaneous activation group at the ended time point of the application C. Moreover, since applications B and D are activated at the ended time point of the application A, the CPU 11 registers the applications A, B, and D as the simultaneous activation group at the ended time point of the application A. Similarly, the applications B, D, and E are registered as the simultaneous activation group at the ended time point of the application B, and the applications A and B are registered as the simultaneous activation group at the second ended time point of the application A. As described above, the CPU 11 is capable of grouping a plurality of applications having time slots during which the applications have been activated at the same time by detecting an application that has been activated at a time point (right before) a certain application is ended.

As a combination of applications that are likely to be activated at the same time as described above, there are, for example, a combination of a browser and a document/figure/presentation creation application and a combination of an image reproduction application and an image edit application, though not limited thereto.

By periodically making the inquiry to the OS and repeating the processing every time the application is activated or ended, the CPU 11 generates the simultaneous activation group information as latest information at all times. Moreover, when all the applications within a group already registered as the simultaneous activation group are activated at the same time again, the CPU 11 updates the activation count information of the simultaneous activation group.

FIG. 5 is a diagram showing an example of data stored in the simultaneous activation group DB 27. As shown in the figure, in the simultaneous activation group DB 27, a list of applications included in the groups is stored as a plurality of pieces of simultaneous activation group information, and activation count information of each simultaneous activation group is also stored therein. Those pieces of information are updated every time the processing is executed.

(Display Processing for Group Activation Button)

Figure 6:
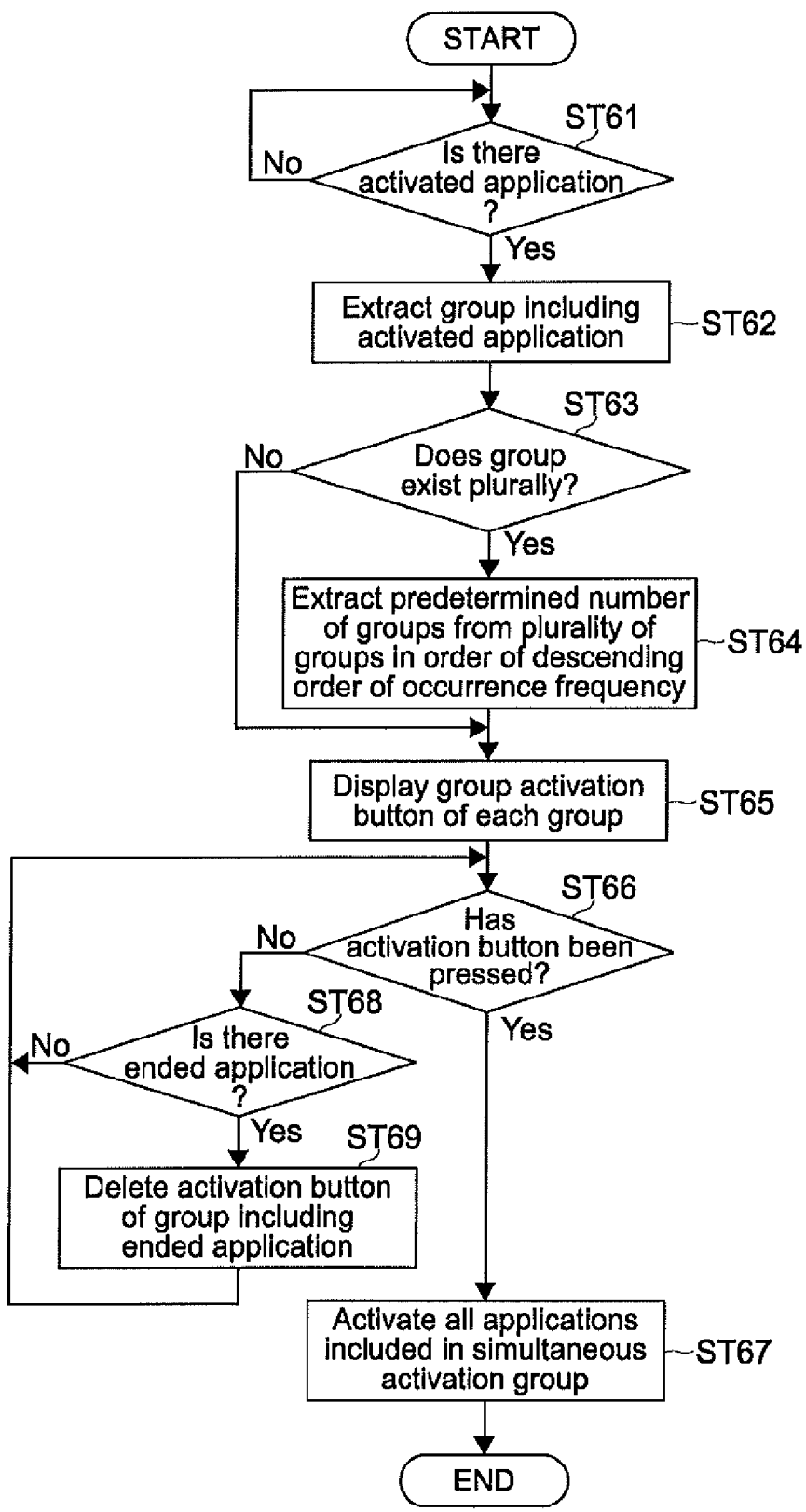
FIG. 6 is a flowchart showing a flow of display processing for a group activation button that is carried out by the PC according to the embodiment of the present disclosure.

Next, display processing for the group activation button that uses the generated simultaneous activation group information (and activation count information) will be described. FIG. 6 is a flowchart showing a flow of the display processing for the group activation button.

As shown in the figure, the CPU 11 first makes an inquiry to the OS to judge whether there is an activated application (Step 61). When judged that there is an activated application (Yes), the CPU 11 references the simultaneous activation group DB 27 and extracts simultaneous activation group information including the activated application (Step 62).

Subsequently, the CPU 11 judges whether there are a plurality of simultaneous activation groups that include the activated application (Step 63). When judged that there are a plurality of simultaneous activation groups (Yes), the CPU 11 extracts a predetermined number (e.g., 2 or 3) of groups from the plurality of groups in a descending order of an occurrence frequency (Step 64).

Next, the CPU 11 displays a group activation button corresponding to the extracted simultaneous activation groups on the GUI (window) of the application launcher (Step 65).

Figure 7:
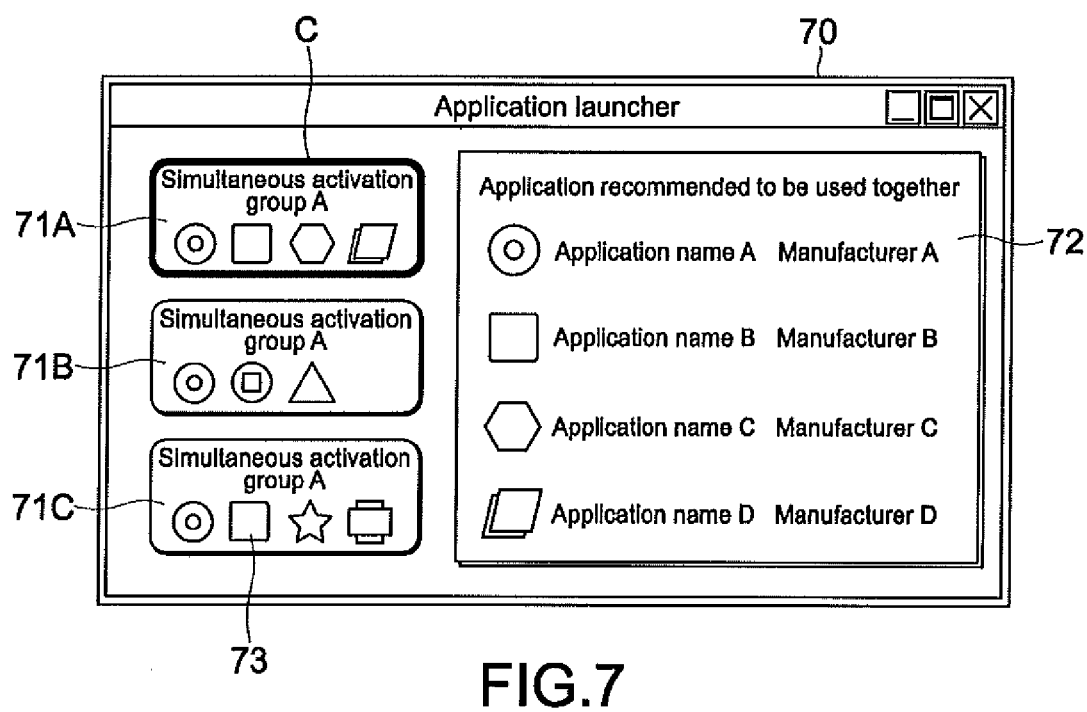
FIG. 7 is a diagram showing an example of GUIs including the group activation button that is displayed in the embodiment of the present disclosure.

FIG. 7 is a diagram showing an example of the GUI of the application launcher including the group activation buttons. As shown in the figure, on a GUI 70, a group activation button 71 for activating all the applications included in each of the extracted simultaneous activation groups at the same time and a group details column 72 that indicates detailed information of the applications included in the simultaneous activation group are displayed.

In each group activation button 71, a group name and icons 73 that indicates each application included in the group are displayed, for example. The group name may be edited by a user.

In the group details column 72, information indicating an application name and manufacturer of applications corresponding to the group activation button 71 on which a cursor C is positioned out of the group activation buttons 71 is displayed, for example. In the group details column 72, text information that recommends activation of an application that belongs to the group is also displayed.

By drag-and-dropping an activation icon I of a certain application to any of the group details columns 72 on the GUI 70 from outside the GUI 70 (e.g., from desktop or start menu), for example, the user can add that application to the group. When the drag-and-drop operation is made, the CPU updates the information in the simultaneous activation group DB 27 as well as reflect information of the operation target application (icon, application name, manufacturer) on the GUI. After the operation, the group activation button 71 and the group details column 72 are displayed while also including the added application.

Figure 8A:
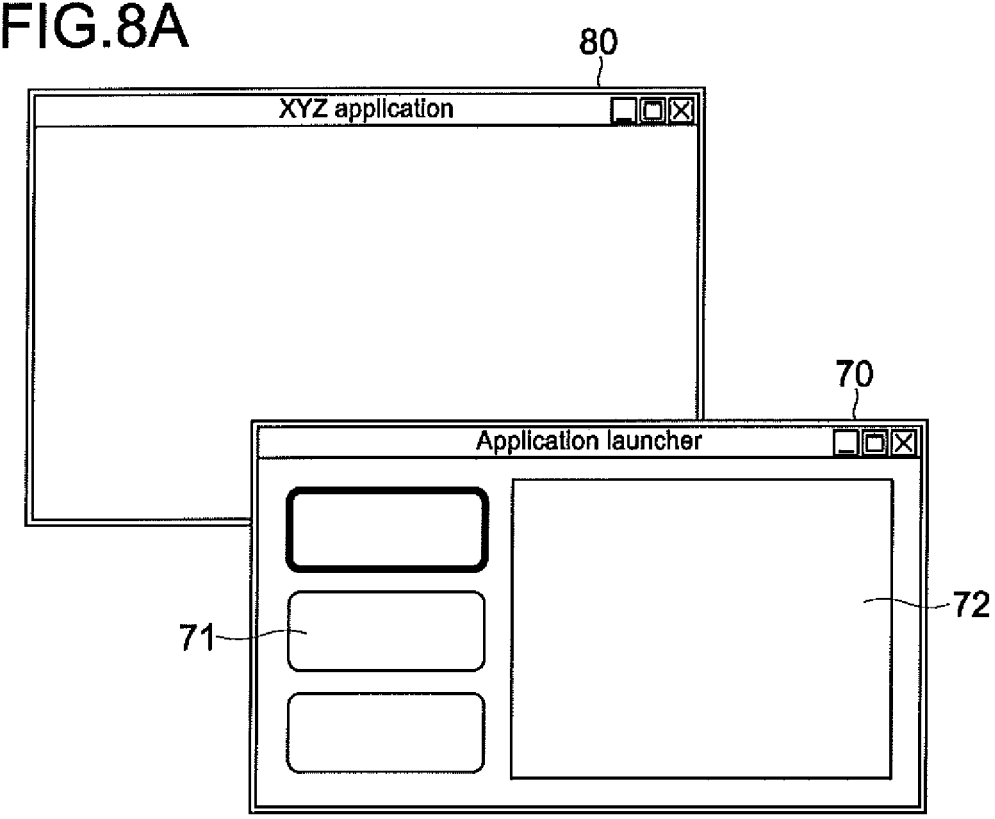
FIG. 8 are diagrams showing examples of a GUI display pattern of the application launcher that is displayed in the embodiment of the present disclosure.
Figure 8B:
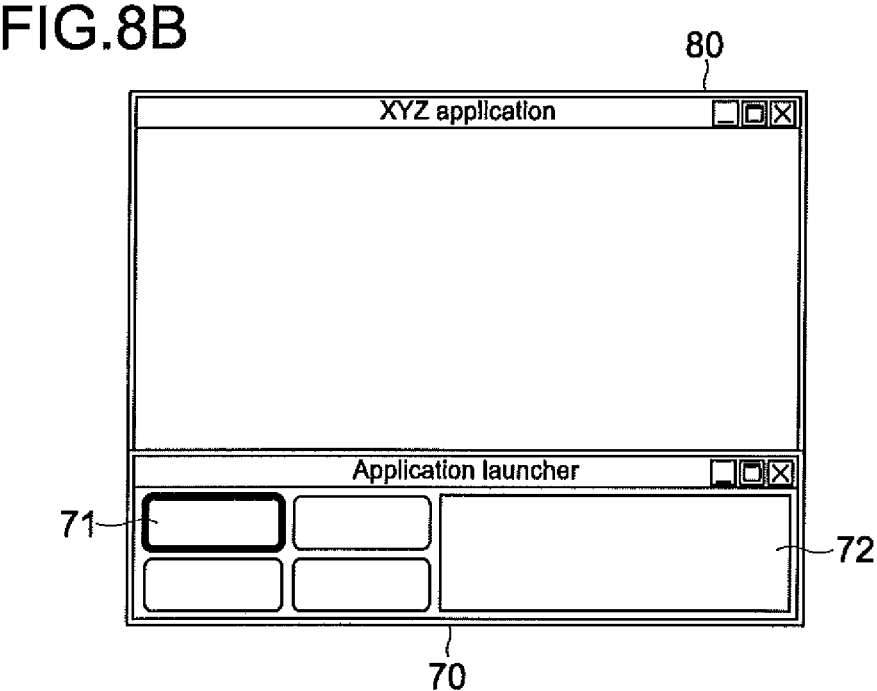

FIG. 8 are diagrams showing examples of a display pattern of the GUI 70. There are two examples of FIGS. 8A and 8B as the display pattern.

In the pattern shown in FIG. 8A, the GUI 70 is displayed as a window that is independent from a window 80 of an application that is being executed. In the pattern shown in FIG. 8B, the GUI 70 is displayed as a part of the window 80 of the application that is being executed in an interlocking manner with the window 80. In other words, when the window 80 of the application that is being executed is moved, the GUI 70 also moves along with it. Although the GUI 70 is displayed at a lower end of the window 80 in the example of FIG. 8B, the GUI 70 may be displayed at any position in lateral and longitudinal directions.

Referring back to FIG. 6, the CPU 11 judges whether any of the displayed group activation buttons 71 has been pressed (Step 66). When judged that the group activation button 71 has been pressed (Yes), the CPU 11 activates all the applications (excluding already-activated application) included in the simultaneous activation group corresponding to the group activation button 71 at the same time (Step 67).

On the other hand, when judged that the group activation button 71 has not been pressed (No in Step 66), the CPU 11 judges whether there is an ended application (Step 68). Then, when a group activation button 71 of a simultaneous activation group including the ended application is displayed, the CPU 11 deletes the group activation button 71 from the GUI (Step 69).

The CPU 11 repeats the above processing every time the user makes an application activation operation. Therefore, the group activation button 71 displayed on the GUI 70 changes with time depending on the user operation.

(End Processing for Group-Activated Application)

Next, processing of ending a plurality of applications that have been activated as a group using the group activation button 71 will be described.

Figure 9:
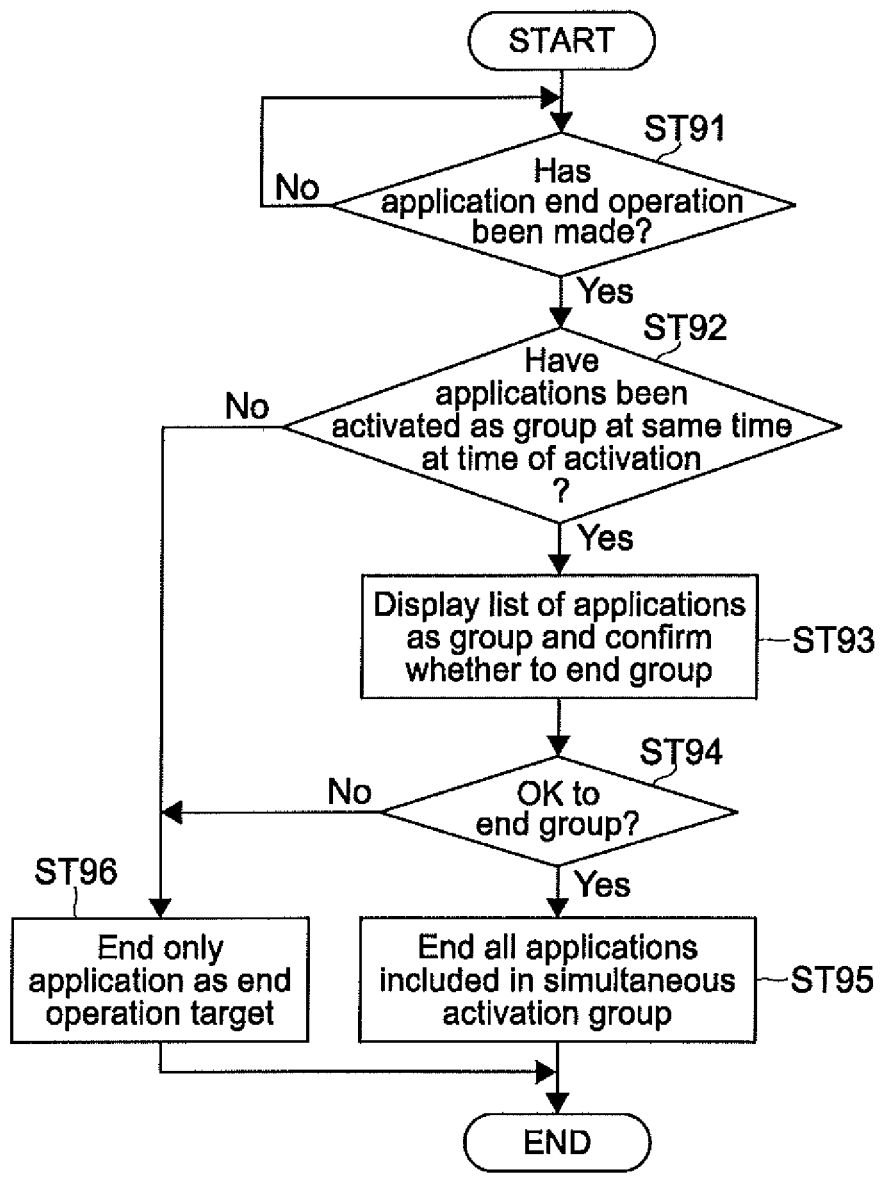
FIG. 9 is a flowchart showing a flow of end processing for an application activated within a group, that is carried out by the PC according to the embodiment of the present disclosure.

First, the application end processing in a case where an end operation for any of the applications is made after a plurality of applications of a group are activated will be described. FIG. 9 is a flowchart showing a flow of the processing.

As shown in the figure, the CPU 11 first judges whether an end operation for any of the applications has been input (Step 91). When judged that the end operation has been input (Yes), the CPU 11 judges whether the application as the end operation target has been activated simultaneous with other applications within the group at the time of the activation (Step 92).

Subsequently, the CPU 11 displays a list of applications of the group including the application as the end operation target and prompts the user to confirm whether to end all the applications (as group) in the list using, for example, a YES/NO button (Step 93).

When a response to the confirmation to end is input from the user (Yes in Step 94), the CPU 11 ends all the applications included in the simultaneous activation group at the same time (Step 95).

On the other hand, when a response not to end is input from the user (No in Step 94), the CPU 11 ends only the application as the end operation target (Step 96).

Here, the CPU 11 may display a checkbox for prompting the user to select an application that may be ended from the simultaneous activation group before ending the application as the end operation target, and selectively end an application based on the user operation.

Figure 10:
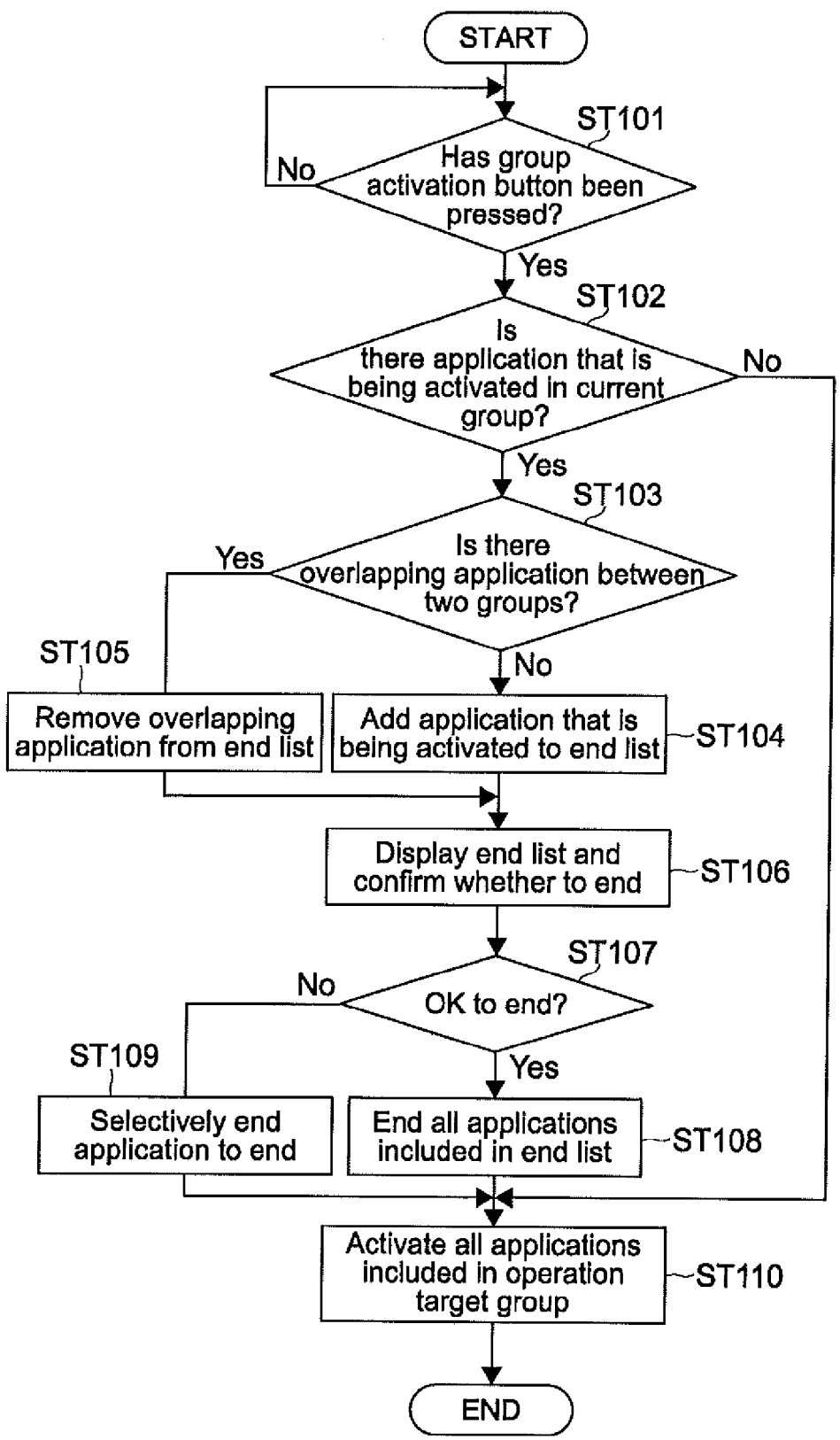
FIG. 10 is a flowchart showing a flow of processing carried out by the PC according to the embodiment of the present disclosure in a case where a group activation operation is made for a plurality of groups.

Next, processing carried out in a case where a new group activation operation is made after a plurality of applications of a group are activated will be described. FIG. 10 is a flowchart showing a flow of the processing.

As shown in the figure, the CPU 11 first judges whether the group activation button 71 has been pressed (Step 101). When judged that the group activation button 71 has been pressed (Yes), the CPU 11 judges whether there are applications activated as a group at that time point (applications previously activated by group activation button 71) (Step 102).

When judged that there are no applications activated as a group (No), the CPU 11 activates all the applications corresponding to the operation target group activation button 71 (Step 110).

On the other hand, when judged that there are applications activated as a group (Yes), the CPU 11 judges whether there is an overlapping application between the group corresponding to the group activation button 71 pressed in Step 101 and the group that is being activated (Step 103).

When judged that there is no overlapping application (No), the CPU 11 adds all the applications that are being activated in the group to an end list (Step 104). On the other hand, when judged that there is an overlapping applications (Yes), the CPU 11 removes the overlapping application from the end list (Step 105).

Subsequently, the CPU 11 displays the end list and prompts the user to confirm whether to end all the applications on the list using, for example, a YES/NO button (Step 106).

When a response to the confirmation to end is input from the user (Yes in Step 107), the CPU 11 ends all the applications included in the end list at the same time (Step 108).

On the other hand, when a response not to end is input from the user (No in Step 107), the CPU 11 displays a checkbox or the like to prompt the user to select an application to be ended from the end list and selectively ends the application based on the user operation (Step 109). Here, the CPU 11 may continue executing all the applications on the end list without confirming the user.

Then, the CPU 11 activates all the applications included in the simultaneous activation group corresponding to the pressed group activation button 71 at the same time (Step 110).

SUMMARY

As described above, according to this embodiment, the PC 100 stores simultaneous activation group information that indicates a plurality of applications that have been activated at the same time and activation count information of each group in the simultaneous activation group DB 27. Moreover, the PC 100 is capable of displaying a group activation button for simultaneously activating a plurality of applications that are highly likely to be used at the same time based on the simultaneous activation group information and activation count information, and activating those applications at the same time based on a user operation.

The PC 100 is also capable of simultaneously ending a plurality of applications that have been activated as a group at a time an end operation for any of the applications within the group is made or at a timing other group activation buttons are pressed.

MODIFIED EXAMPLE

The present disclosure is not limited to the above embodiment and can be variously modified without departing from the gist of the present disclosure.

In the above embodiment, a predetermined number (e.g., 2 or 3) of simultaneous activation groups have been extracted in a descending order of an occurrence frequency, and a plurality of group activation buttons 71 corresponding to those groups have been displayed on the GUI 70 of the application launcher. However, it is also possible to display a group activation button 71 of only a simultaneous activation group having a maximum occurrence frequency (activation count) or display the group activation buttons 71 for all the simultaneous activation groups including the activated application in the order of the occurrence frequency, for example.

In the above embodiment, for activating applications as a group, the group activation buttons 71 each including a group name and icons of applications included in the group have been displayed. However, a single icon including the function of the group activation button 71 may be displayed instead. In this case, it is possible to allow a user to select which icon is to be associated with a simultaneous activation group.

In the above embodiment, when the group activation button 71 is newly pressed after a plurality of applications are activated as a group, previously-activated applications have been ended when there is no overlapping application between the two groups. However, the application launcher may provide a group switch activation button and a group addition activation button on the GUI 70 of the application launcher, for example. In this case, when the group switch activation button is pressed, all applications within a new simultaneous activation group are activated instead of ending all of the plurality of applications that have been previously activated as a group. On the other hand, when the group addition activation button is pressed, all applications within a new simultaneous activation group are activated without ending the plurality of applications that have been previously activated as a group.

Further, the application launcher may generate a plurality of applications having close end times as a simultaneous activation group based on activation/end histories of the applications and end the applications within the simultaneous activation group at the same time.

Furthermore, the application launcher may end, when there are a plurality of applications that are not operated for a predetermined time (e.g., several hours) after activation, those applications at the same time.

In the above embodiment, the simultaneous activation group has been generated for all applications that have been activated and ended on the PC 100. However, it is also possible to remove a so-called resident application that is automatically activated in an interlocking manner with an activated OS, for example. As a result, it is possible to prevent an application that does not need to be activated at the same time from being activated at the same time If an OS is Windows (registered trademark), a list of the resident applications can be obtained from "startup". Moreover, the application launcher may remove an application that is being activated for more than a predetermined time (e.g., 5 or 10 hours) or an application included in all the simultaneous activation groups without referencing startup.

It should be noted that even when the resident application is not removed from the simultaneous activation group, the resident application is already activated at a time point the user activates some kind of an application in many cases. Therefore, the application launcher avoids, when there is an already-activated application in activating an application belonging to the simultaneous activation group, re-activating that application, to obtain the same effect as that described above.

Although groups have been created based on whether there are time slots during which applications have been activated at the same time in the above embodiment, inter-application content input/output information may also be used for creating groups. Specifically, when a file is handed over from a certain application to another application, for example, the application launcher acquires information (application name of output source, application name of output destination, and format of output file) from an OS. Then, the application launcher stores information that a file of a certain format (e.g., JPEG) is output from an application A and input to an application B based on those pieces of information, and groups the output source application and output destination application based on that information.

In this case, since a relationship that a file is input and output between applications is apparent, the application launcher may display, in the group activation button 71 or the group details column 72, information that indicates a connection between the output source application and the output destination application for merely distinguishing them from an application that has been activated at the same time.

The above embodiment has been described based on the presupposition that a plurality of applications belonging to a simultaneous activation group corresponding to a group activation button 71 are all installed in the PC 100. However, when simultaneous activation group information received from the server 10 is used, a simultaneous activation group including an application that is installed in other PCs 200 but not installed in the PC 100 may be recommended. In such a case, the application launcher may prompt the user to confirm whether to download an application that belongs to the simultaneous activation group and is not installed in the PC 100 from the server 10 and download the application in response to the user operation to install and activate it.

Although the application launcher has displayed the group activation button 71 also using the simultaneous activation group information received from the server 10 in the above embodiment, it is also possible to display the group activation button 71 based only on the simultaneous activation group information stored in an environment where the server 10 does not exist, that is, the simultaneous activation group information that has been stored locally.

In the above embodiment, an application to be group-activated has been installed in and executed on the PC 100. However, the application to be group-activated may be executed by an ASP (e.g., server 10 described above) on the network 50 to be used by the PC 100 instead of being installed in the PC 100. Also in this case, by recording history information that indicates that an application activation request or end request has been transmitted to the ASP via a browser, the PC 100 can structure data similar to the simultaneous activation group DB 27 and reflect it on the application launcher. The history information may of course be recorded on the ASP side instead of the PC 100 and provided to the PC 100.

Although the PC has been adopted as the information processing apparatus of the present disclosure in the above embodiment, the present disclosure is also applicable to various other information processing apparatuses such as a television apparatus, a recording/reproducing apparatus, a game apparatus, a digital still camera, a digital video camera, a cellular phone, a smart phone, a PDA (Personal Digital Assistance), an electronic book terminal, an electronic dictionary, a portable AV apparatus, and a car navigation apparatus.

The present disclosure contains subject matter related to that disclosed in Japanese Priority Patent Application JP 2010-187610 filed in the Japan Patent Office on Aug. 24, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   an output unit configured to output an image;
   an operation input unit configured to receive an operation of a user;
   a storage configured to store a group information item that indicates, as one group, a plurality of applications having time slots during which the applications have been activated at the same time out of a plurality of applications that have been activated and ended; and
   a controller configured to control the output unit to output, when an operation for activating a first application out of the plurality of applications is input by the operation input unit, an operation image for activating all the applications within the group including the first application at the same time based on the group information item.

2. The information processing apparatus according to claim 1,
   wherein the storage stores, for a plurality of applications that have been activated at the same time at different time slots, a plurality of group information items and an activation count information item that indicates, within a predetermined period, an activation count of each group indicated by each of the plurality of group information items, and
   wherein the controller controls the output unit to output, when an operation for activating the first application is input, the operation image at least for a group having a highest activation count out of a plurality of groups including the first application, based on the plurality of group information items and the activation count information item.

3. The information processing apparatus according to claim 2,
wherein the controller ends, when an operation for ending any of the applications included in the group that has been activated at the same time is input, all the applications included in the group at the same time.

4. The information processing apparatus according to claim 3,
wherein the controller controls the output unit to output a first operation image corresponding to a first group information item out of the plurality of group information items and a second operation image corresponding to a second group information item different from the first group information item, and
wherein the controller compares the first group information item and the second group information item when the user operation with respect to the second operation image is received while a plurality of applications indicated by the first group information item are being executed based on the user operation with respect to the first operation image, and ends all the applications included in a group indicated by the first group information item at the same time when it is judged that any of the applications included in the group indicated by the first group information item is not included in a group indicated by the second group information item.

5. The information processing apparatus according to claim 3,
wherein the controller controls the output unit to output, while a plurality of applications indicated by first group information item are being executed based on the user operation with respect to a first operation image corresponding to the first group information item out of the plurality of group information items, a second operation image for activating a plurality of applications indicated by a second group information item different from the first group information item in place of a plurality of applications indicated by the first group information item and a third operation image for activating in addition to the plurality of applications indicated by the first group information item.

6. The information processing apparatus according to claim 2, further comprising
a communication unit configured to receive the group information item and the activation count information item from a server storing the group information item and the activation count information item related to applications activated in a plurality of other information processing apparatuses,
wherein the controller controls the output unit to output the operation image based on the stored group information item and activation count information item and the group information item and the activation count information item received from the server.

7. An application control method for use with an information processing apparatus, said method comprising:
storing, in a storage memory device, group information that indicates, as one group, a plurality of applications having time slots during which the applications have been activated at the same time out of a plurality of applications that have been activated and ended; and
outputting, when an operation for activating a first application out of the plurality of applications is input, an operation image for activating all the applications within the group including the first application at the same time based on the group information.

8. A non-transitory computer readable medium having stored thereon a program causing an information processing apparatus to execute the steps of:
storing group information that indicates, as one group, a plurality of applications having time slots during which the applications have been activated at the same time out of a plurality of applications that have been activated and ended; and
outputting, when an operation for activating a first application out of the plurality of applications is input, an operation image for activating all the applications within the group including the first application at the same time based on the group information.

* * * * *